(12) United States Patent
Geyer

(10) Patent No.: US 10,675,569 B1
(45) Date of Patent: Jun. 9, 2020

(54) PORTABLE WATER FILTER

(71) Applicant: Fred Geyer, Winamac, IN (US)

(72) Inventor: Fred Geyer, Winamac, IN (US)

(*) Notice: Subject to any disclaimer, the term of this patent is extended or adjusted under 35 U.S.C. 154(b) by 297 days.

(21) Appl. No.: 15/274,523

(22) Filed: Sep. 23, 2016

(51) Int. Cl.
| | |
|---|---|
| C02F 9/02 | (2006.01) |
| B01D 29/56 | (2006.01) |
| B01D 29/00 | (2006.01) |
| B01D 35/26 | (2006.01) |
| C02F 1/00 | (2006.01) |
| C02F 1/28 | (2006.01) |
| C02F 9/00 | (2006.01) |

(52) U.S. Cl.
CPC ......... *B01D 29/56* (2013.01); *B01D 29/0093* (2013.01); *B01D 35/26* (2013.01); *C02F 1/001* (2013.01); *C02F 1/003* (2013.01); *C02F 1/283* (2013.01); *C02F 9/005* (2013.01); *C02F 2201/002* (2013.01)

(58) Field of Classification Search
CPC .. C02F 1/003; C02F 1/283; C02F 9/00; C02F 9/005; C02F 2201/002; B01D 29/0093; B01D 29/56; B01D 35/26
See application file for complete search history.

(56) References Cited

U.S. PATENT DOCUMENTS

| | | | |
|---|---|---|---|
| 7,658,846 B1* | 2/2010 | Yang ...................... | C02F 9/005 210/232 |
| 2003/0222010 A1* | 12/2003 | Bassett .................. | B01D 27/06 210/312 |
| 2005/0103721 A1* | 5/2005 | Fritze ..................... | C02F 1/004 210/744 |

* cited by examiner

Primary Examiner — Matthew O Savage
(74) Attorney, Agent, or Firm — Ice Miller LLP

(57) ABSTRACT

A water filter is provided. The water filter includes a melt blown filter including a melt blown filter inlet. The melt blown filter inlet forms a water filter inlet. A carbon filter is in fluid communication with the melt blown filter. A thermoplastic polymer filter is in fluid communication with the carbon filter. The thermoplastic polymer filter includes a thermoplastic polymer filter outlet. The thermoplastic polymer filter outlet forms a water filter outlet.

11 Claims, 12 Drawing Sheets

PORTABLE WATER FILTER

BACKGROUND

Generally, water filter assemblies include a single filter that is constructed and arranged to filter one type of contaminant. For example, a water filter assembly may be constructed and arranged to filter one of sediment, metals, bacteria, or viruses. Unfortunately, when traveling, sources of water may contain numerous contaminants that are in need of being filtered from the water. Accordingly, even after filtering such sources of water with a known water filter assembly, the source of water may still be dangerous to drink or use for cleaning.

Additionally, bringing clean water when traveling may take up a significant amount of space. For example, many recreational vehicles include water tanks to carry clean water. These tanks are typically very large and require a significant amount of room in the recreational vehicle. Moreover, these tanks may be significantly heavy, such that the tanks may crack fixtures and plumbing within the recreational vehicle while the vehicle is traveling.

A need remains for a portable, compact, and light-weight water filter that is capable of filtering sediment, chemicals, metals, bacteria, viruses, and fungi from the water, to name a few non-limiting examples.

SUMMARY

In one aspect, a water filter is provided. The water filter includes a first filter, wherein the first filter is a melt blown filter including a first filter inlet. The first filter inlet forms a water filter inlet. A second filter is provided. The second filter is a carbon filter in fluid communication with the first filter. A third filter is provided. The third filter is a thermoplastic polymer filter in fluid communication with the second filter. The third filter includes a third filter outlet. The third filter outlet forms a water filter outlet.

In one aspect, the water filter inlet is constructed and arranged to couple to a source of pressurized water.

In one aspect, water flows through the first filter, the second filter, and the third filter in series.

In one aspect, the first filter includes a first filter outlet.

In one aspect, the second filter includes a second filter inlet that is in fluid communication with the first filter outlet.

In one aspect, the second filter inlet in fluid communication with the first filter outlet via an intermediate chamber.

In one aspect, a first filter chamber houses the first filter. An intermediate chamber is provided. A second filter chamber houses the second filter. A third filter chamber houses the third filter.

In one aspect, a first passageway extends between the first filter chamber and the intermediate chamber. A second passageway extends between the intermediate chamber and the second filter chamber. An opening extends between the second filter chamber and the third filter chamber.

In one aspect, the first filter includes a first filter outlet that extends through the first passageway. The second filter includes a second filter inlet that extends through the second passageway.

In one aspect, a water filter assembly is provided having an unfiltered water reservoir. A pump is in fluid communication with the unfiltered water reservoir. A water filter is in fluid communication with the pump. The water filter includes a first filter. The first filter is a melt blown filter including a first filter inlet. The first filter inlet is in fluid communication with the pump. A second filter is a carbon filter in fluid communication with the first filter. A third filter is a thermoplastic polymer filter in fluid communication with the second filter. The third filter includes a third filter outlet. A water filter assembly outlet is in fluid communication with the third filter outlet.

In one aspect, an unfiltered water passage couples the unfiltered water reservoir to the pump. A pressurized water passage couples the pump to the first filter inlet in fluid communication. A filtered water passage couples the water filter assembly outlet to the third filter outlet in fluid communication.

In one aspect, water flows through the first filter, the second filter, and the third filter in series.

In one aspect, a method of manufacturing a water filter is provided. The method includes coupling a second filter in fluid communication with a first filter. The second filter is a carbon filter and the first filter is a melt blown filter including a first filter inlet that forms a water filter inlet. The method also includes coupling a third filter in fluid communication with the second filter. The third filter is a thermoplastic polymer filter that includes a third filter outlet that forms a water filter outlet. The first filter, the second filter, and the third filter are coupled in fluid communication such that water flows through the first filter, the second filter, and the third filter in series.

In one aspect, the method includes constructing and arranging the water filter inlet to couple to a source of pressurized water.

In one aspect, the method includes constructing and arranging the first filter with a first filter outlet.

In one aspect, the method includes constructing and arranging the second filter with a second filter inlet. The method also includes coupling the second filter inlet in fluid communication with the first filter outlet.

In one aspect, the method includes coupling the second filter inlet in fluid communication with the first filter outlet via an intermediate chamber.

In one aspect, the method includes housing the first filter in a first filter chamber. The method also includes housing the second filter in a second filter chamber. The method also includes housing the third filter in a third filter chamber.

In one aspect, the method includes extending a first passageway between the first filter chamber and the intermediate chamber. The method also includes extending a second passageway between the intermediate chamber and the second filter chamber. The method also includes extending an opening between the second filter chamber and the third filter chamber.

In one aspect, the method includes extending a first filter outlet of the first filter through the first passageway. The method also includes extending a second filter inlet of the second filter through the second passageway.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION

Figure 1:
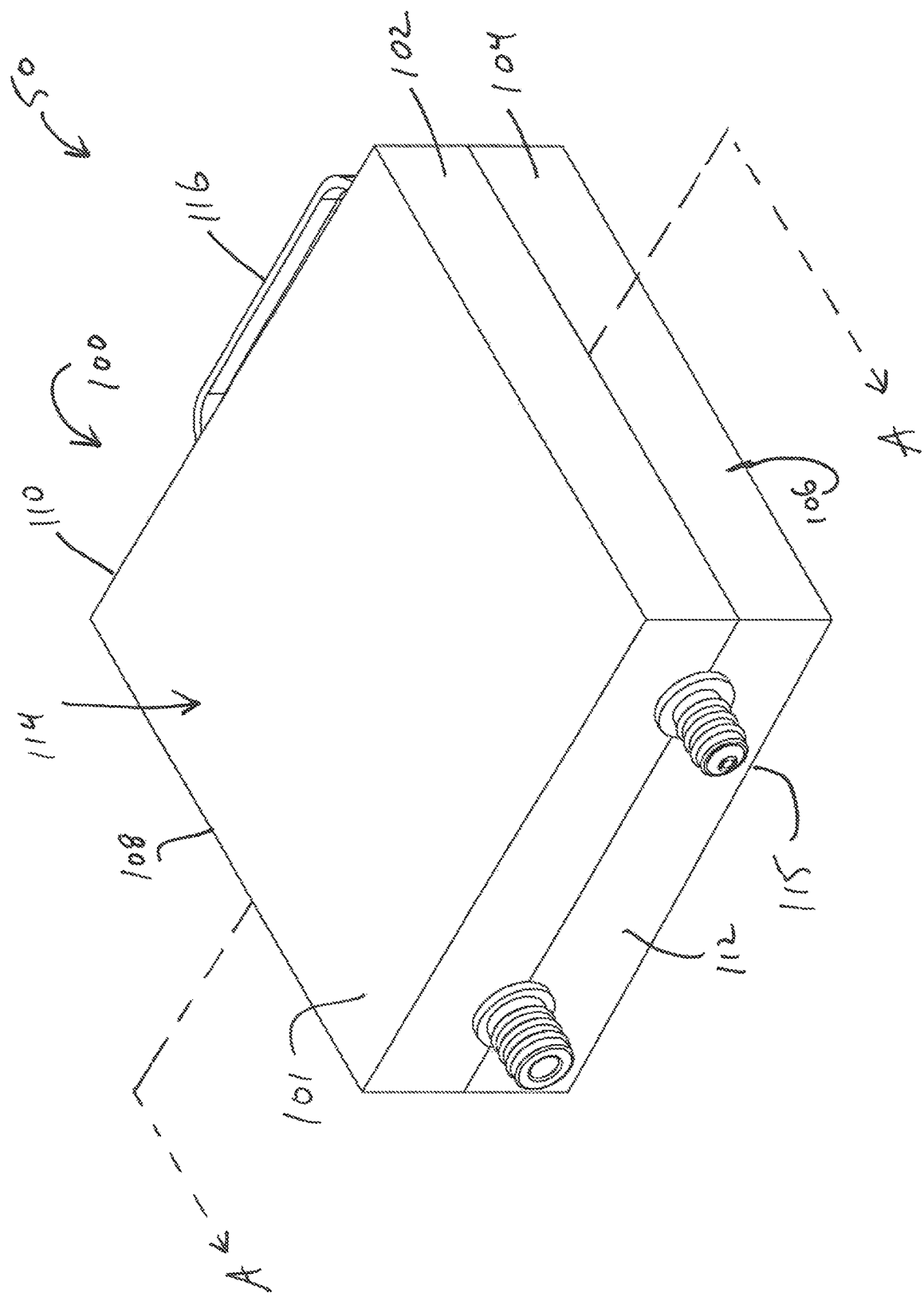
FIG. 1 is a side perspective view of a water filter formed in accordance with an embodiment of the present disclosure.
Figure 2:
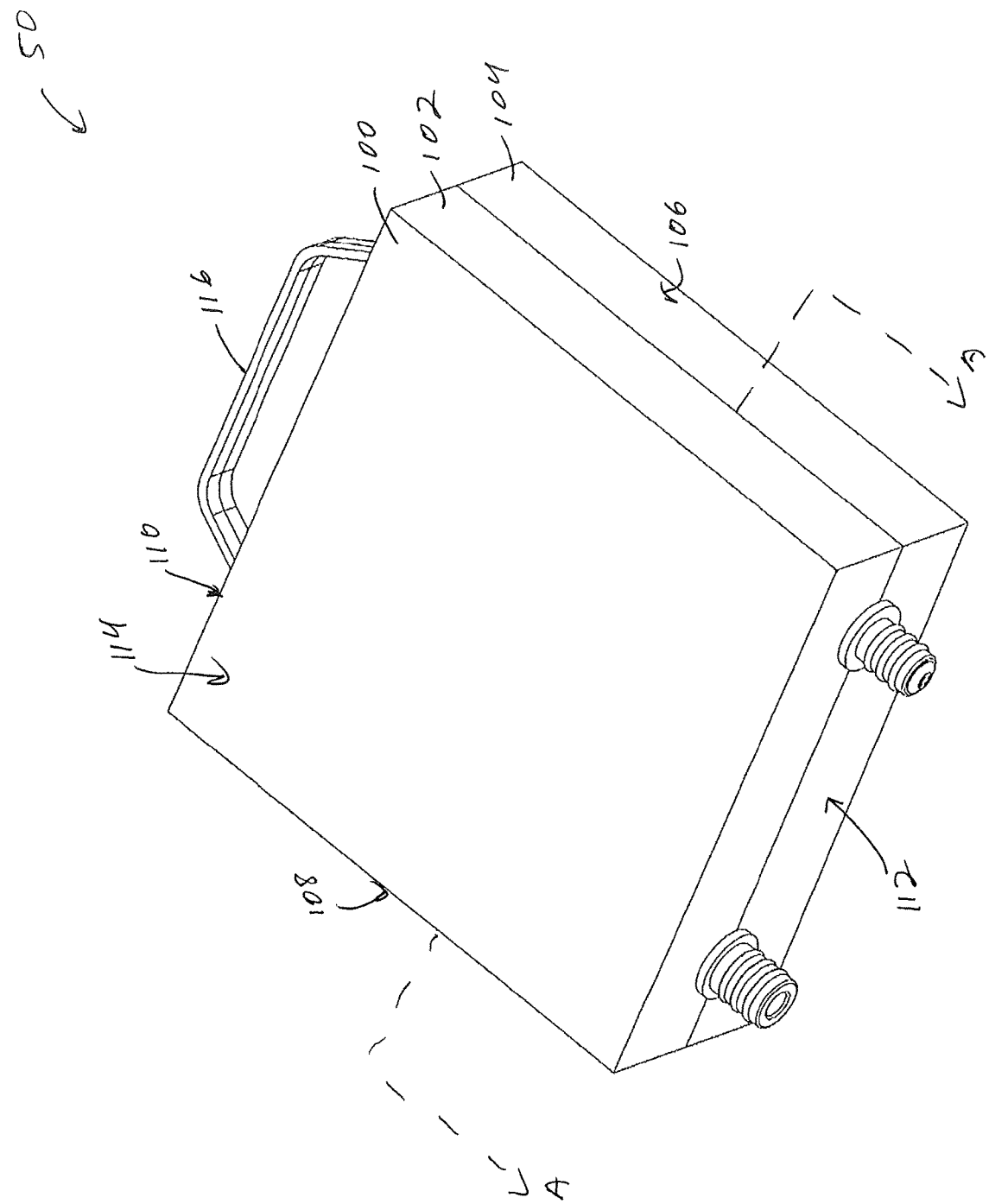
FIG. 2 is a side perspective view of a water filter formed in accordance with an embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIGS. 1-4 illustrate a water filter 50 including a housing 100 having a first section 102 and a second section 104. The first section 102 and the second section 104 are constructed and arranged to be coupled to form the housing 100 after filter components (described in more detail below) are positioned within the first section 102 and the second section 104. In one embodiment, the first section 102 and the second section 104 are coupled via ultrasonic welding. It will be appreciated by one of skill in the art that other methods of coupling the first section 102 and the second section 104 may be utilized. The water filter 50 includes a top 106, a bottom 108, a first side 110 extending between the top 106 and the bottom 108, and a second side 112 extending between the top 106 and the bottom 108 opposite the first side 110. It should be noted that various walls (described in more detail below) extend between the top 106, the bottom 108, the first side 110, and the second side 112. These walls are configured and arranged to also be coupled, for example with ultrasonic welding to define water tight chambers (described in more detail below) within the housing 100.

The housing 100 includes a filtration section 114 to house the filter components, and a handle 116. In the illustrated embodiment, the handle 116 is formed integrally with the filtration section 114. After being presented with the present disclosure, one of skill in the art would recognize that, in one embodiment, the handle 116 may be formed separately from the filtration section 114 and coupled thereto. For example, in one embodiment, the handle 116 may be a strap that is coupled to the filtration section 114. In one embodiment, the handle 116 may be any suitable handle for carrying a water filter. In the illustrated embodiment, the handle 116 is coupled to the first side 110.

Figure 3:
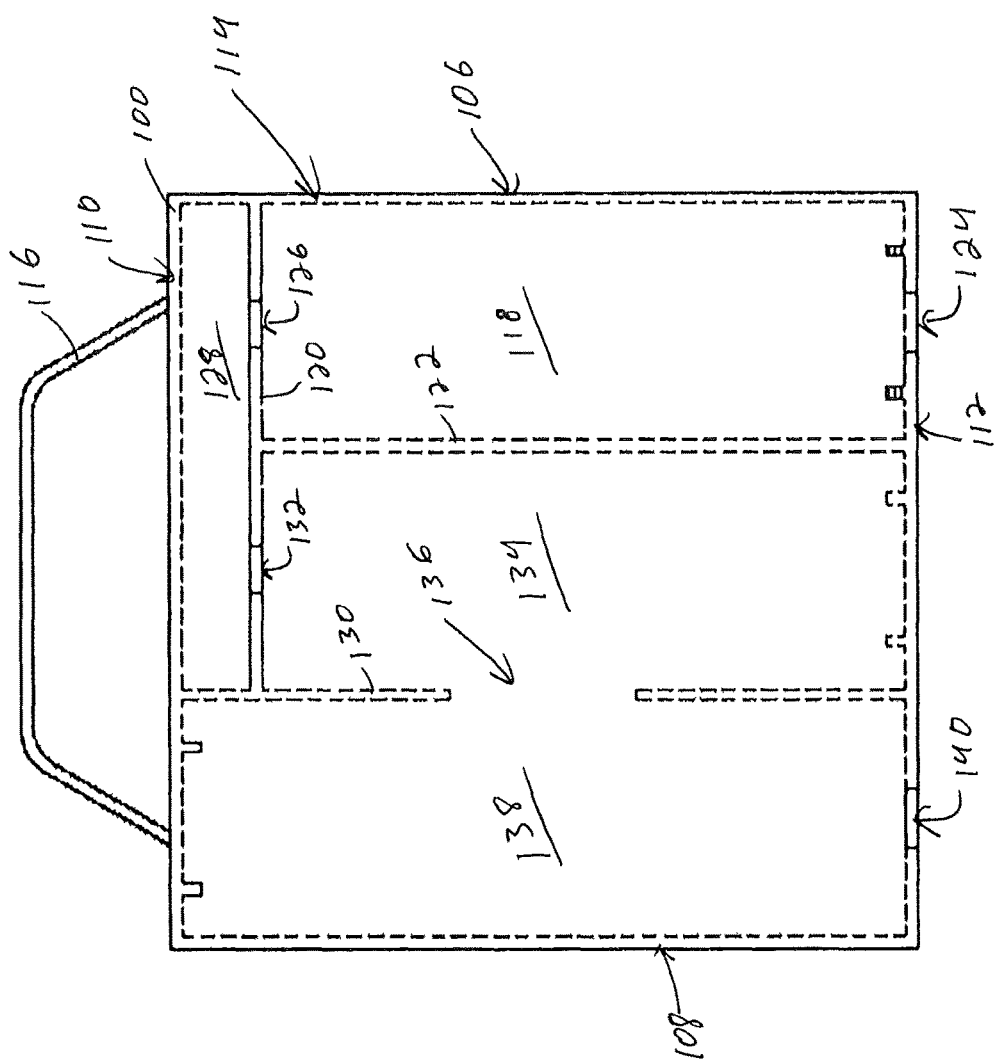
FIG. 3 is a cross-sectional view of a water filter formed in accordance with an embodiment of the present disclosure taken along line A-A, as illustrated in FIGS. 1 and 2, wherein the water filter is shown without the internal filter components.

FIG. 3 is a cross-sectional view of the housing 100 without the filter components therein. The first section 102 and the second section 104, when coupled, define various chambers within the water filter 50. A first filter chamber 118 is defined at least partially by the second side 112 and the top 106. The first filter chamber 118 is also at least partially defined by a wall 120 extending between the top 106 and the bottom 108, and a wall 122 extending between the second side 112 and the wall 120. An inlet 124 extends through the second side 112. A passageway 126 extends through the wall 120 such that the first filter chamber 118 is in flow communication with an intermediate chamber 128.

The intermediate chamber 128 is defined at least partially by the wall 120 and the first side 110. The intermediate is also defined at least partially by the top 106 and a wall 130. The intermediate chamber 128 includes a passageway 132 extending through the wall 120 such that the intermediate chamber 128 is in flow communication with a second filter chamber 134.

The second filter chamber 134 is at least partially defined by the wall 130 and the wall 122. The second filter chamber 134 is also at least partially defined by the wall 120 and the second side 112. In the illustrated embodiment, the intermediate chamber 128 extends across the width of the first filter chamber 118 and the second filter chamber 134 combined. The second filter chamber 134 includes an opening 136 extending through the wall 130 such that the second filter chamber 134 is in flow communication with a third filter chamber 138.

The third filter chamber 138 is at least partially defined by the first side 110 and the second side 112. The third filter chamber 138 is also at least partially defined by the wall 130 and the bottom 108. The third filter chamber 138 includes an outlet 140. In the illustrated embodiment, the outlet 140 extends through the second side 112.

Figure 4:
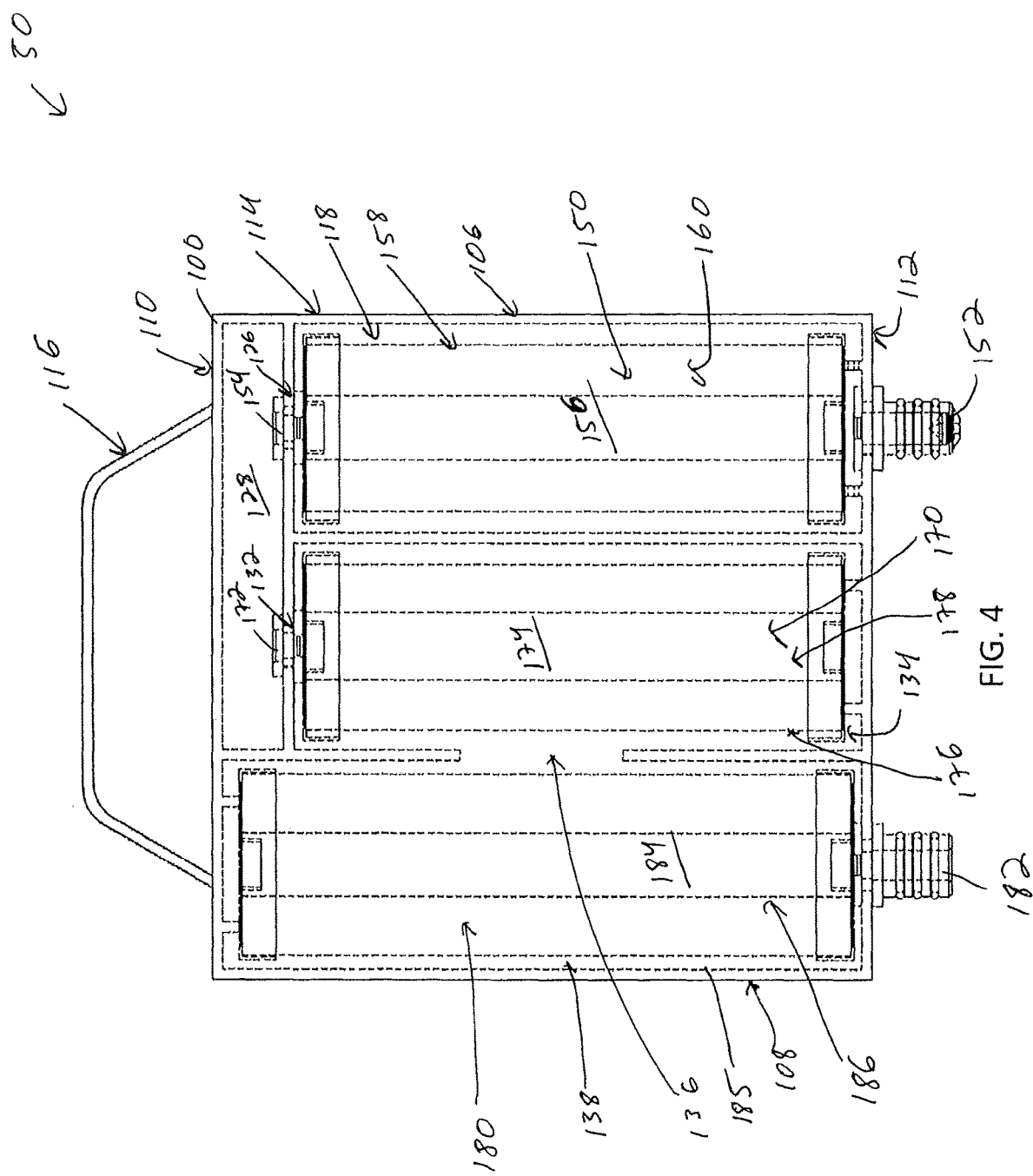
FIG. 4 is a cross-sectional view of a water filter formed in accordance with an embodiment of the present disclosure taken along line A-A, as illustrated in FIGS. 1 and 2, wherein the water filter is shown with the internal filter components.

FIG. 4 is a cross-sectional view of the housing 100 having filter components therein. A first filter component 150 is positioned within the first filter chamber 118. The first filter component 150 includes an inlet fitting 152 and an outlet 154. In one embodiment, the inlet fitting 152 includes a check valve to prevent the back-flow of water from the water filter 50. The first filter component 150 also includes a filter section 156 extending between the inlet fitting 152 and the outlet 154. The filter section 156 has at least one outer wall 158, which defines a chamber 160. The first filter component is positioned within the housing 100 such that the inlet extends through the inlet 124 defined in the second side 112, and the outlet 154 extends through the passageway 126 defined in the wall 120. In one embodiment, the first filter component 150 is a melt-blown filter. In one embodiment, the first filter component 150 is formed from at least one polypropylene, polyethylene, polybutylene terephthalate, nylon, polycarbonate, poly (4-methyl pentene-1), or polystyrene, to name a few non-limiting examples. In one embodiment, the first filter component 150 may include fibrous webs formed from at least one of polymers or resins. In one embodiment, the first filter component 150 includes fibers having a diameter within a range of 0.1 micrometers to 15 micrometers. In one embodiment, the first filter component 150 is constructed and arranged to filter sediment, for example, dirt, sand, and metals, from the water.

A second filter component 170 is positioned within the second filter chamber 134. The second filter component 170 includes an inlet 172. The second filter component 170 also includes a filter section 174 extending from the inlet 172 and having at least one outer wall 176, which defines a chamber 178. The second filter component 170 is positioned within the second filter chamber 134 such that the inlet 172 extends through the passageway 132 defined in the wall 120. In one embodiment, the second filter component 170 is a carbon filter. In one embodiment, the second filter component 170 includes activated carbon to filter contaminants and impurities from the water using chemical adsorption. For example, the second filter component 170 may filter chemicals, such as chlorine, sediment, volatile organic compounds, taste and odor from water, to name a few non-limiting examples. In one embodiment, the second filter component 170 may filter particles having particle sizes within the range of 0.5 micrometers to 50 micrometers. In one embodiment, the second filter component 170 may be a powdered block filter or a granular activated filter, to name two non-limiting examples. In one embodiment, the second filter component 170 may include a secondary media, such as silver, to prevent bacteria growth within the second filter component 170.

A third filter component 180 is positioned within the third filter chamber 138. The third component 180 includes an outlet fitting 182. The third filter component 180 also includes a filter section 184 extending from the outlet fitting 182 and having at least one wall 185 that defines a chamber 186. The third filter component 180 is positioned within the third filter chamber 138 such that the outlet filter 182 extends through the outlet 140 extending through the second side 112. In one embodiment, the third filter component 180 is a thermoplastic polymer filter, for example a polyethersulfone filter. In one embodiment, the third filter component 180 may have a pore size ranging from 0.03 micrometers to 5.0 micrometers. In one embodiment, the third filter component 180 may have a pore size of 0.22 micrometers. In one embodiment, the third filter component 180 may filter fine particles, bacteria, viruses, and fungi from the water to name a few non-limiting examples.

After the first filter component 150, the second filter component 170, and the third filter component 180 are positioned within the housing 100, the second section 104 of the housing 100 is aligned with the first section 102 and coupled thereto. During coupling, the top 106, bottom 108, first side 110, second side 112, wall 120, wall 122, and wall 130 of each of the first section 102 and the second section 104 are coupled, for example with ultrasonic welding.

The water filter 50 is constructed and arranged to be coupled to a source of water. In one embodiment, the water filter 50 is coupled to a source of pressurized water, for example, a vehicle water system having a pump, a municipal water system, or a well having a pump, to name a few non-limiting examples. The source of water is coupled to the inlet fitting 152 of the first filter component 150, which extends from the housing 100 through the inlet 124 defined in the second side 112. In one embodiment, the water filter 50 is positioned to stand on the bottom 108. In one embodiment, the water filter 50 may be positioned in any orientation such that the pressure of the source of water moves the water through the water filter 50. During operation, the water flows through the first filter component 150, the second filter component 170, and the third filter component 180 in series. As shown in FIG. 1, the water filter 50 can include a housing 100 having a plurality of external walls defining a plurality of external sides 101, 106, 108, 110, 112, and 115. The housing includes a first section 102 coupled to a corresponding second section 104 to enclose an interior of the housing. As shown in FIG. 3, the housing is liquid-tight except for a housing inlet 124 and a housing outlet 140. The interior of the housing includes a plurality of internal walls 120, 128, and 130, the plurality of internal walls defining, with the plurality of external walls of the housing, at least a first chamber 118, a second chamber 134, and a third chamber 138 inside the housing. The first chamber 118 is liquid-tight except for the housing inlet 124 through the external wall 112 by which a liquid may be introduced into the first chamber 118 and a first chamber outlet 126 through the internal wall 120 by which the liquid may be released from the first chamber 118. The second chamber 134 is liquid-tight except for a second chamber inlet 132 through one of the internal wall 120 by which a liquid may be introduced into the second chamber 134 and a second chamber outlet 136 through the internal wall 130 by which the liquid may be released from the second chamber 134. The third chamber 138 is liquid-light except for a third chamber inlet 136 through one of the internal wall 130 by which a liquid may be introduced into the third chamber and the housing outlet 140 through one of the external wall 112 by which the liquid may be released from the third chamber 138. As shown in FIG. 4, a first filter component 150 is positioned in the first chamber and arranged such that the liquid, when introduced through the housing inlet 124, via inlet fitting 152, passes through the first filter component 150 in order to be released from the first chamber 118 through the first chamber outlet 126. A second filter component 170, is positioned in the second chamber 134 and arranged such that the liquid, when, introduced through the second chamber inlet 132, passes through the second filter component 170 in order to be released from the second chamber 134 through the second chamber outlet 136. A third filter component 180 is positioned in the third chamber 138 and arranged such that the liquid, when introduced through the third chamber inlet 136, passes through the third filter component 180 in order to be released from the third chamber 134 through the housing outlet 140 via the outlet fitting 182. The second chamber outlet and the third chamber inlet are formed by the opening 136 through the internal wall 130. An intermediate chamber 128 provides communication between the first chamber outlet 126 and the second chamber inlet 132.

Figure 5:
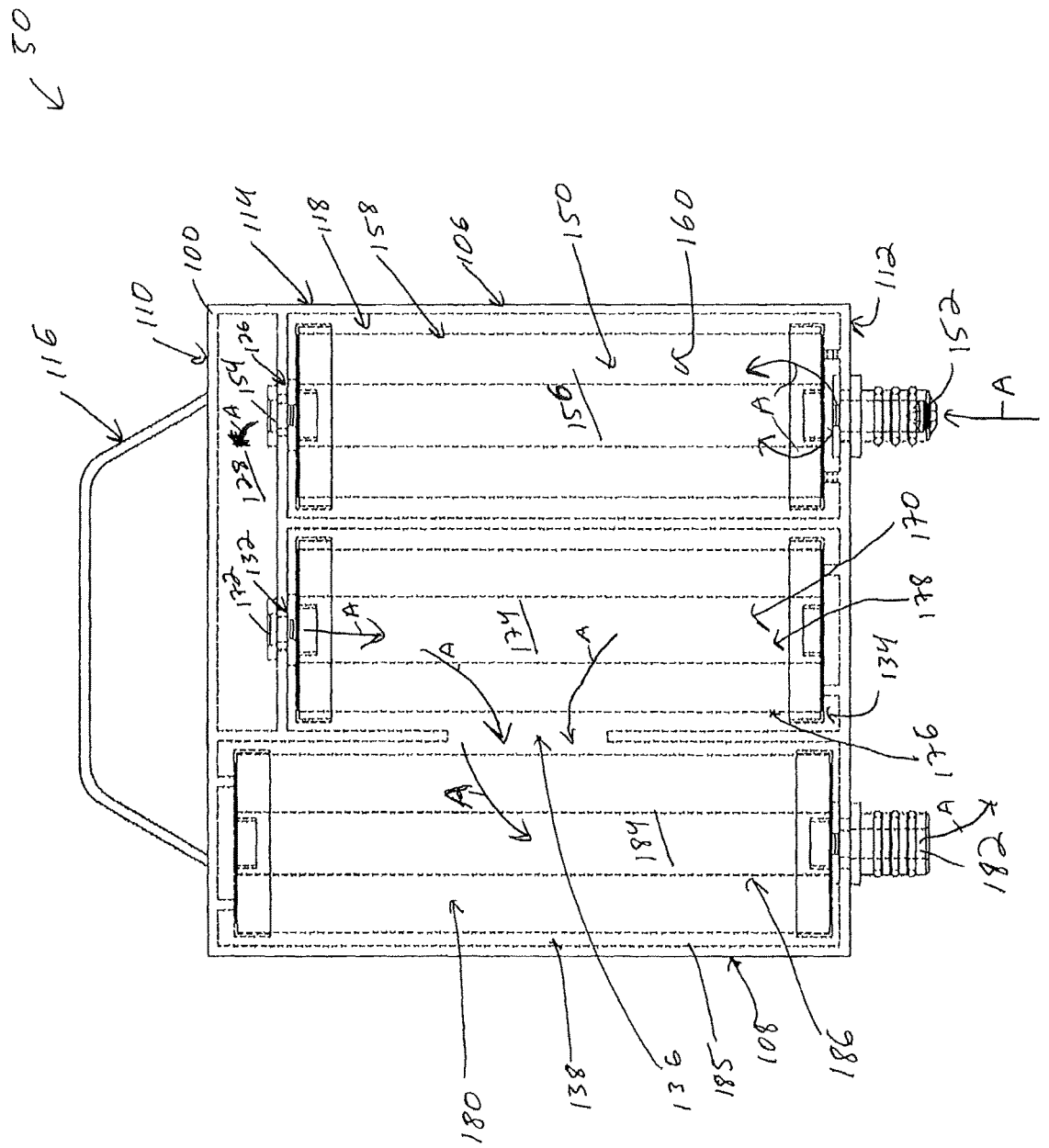
FIG. 5 is a cross-sectional view of a water filter formed in accordance with an embodiment of the present disclosure taken along line A-A, as illustrated in FIGS. 1 and 2, showing the water flow therethrough, wherein the water filter is shown with the internal filter components.
Figure 6:
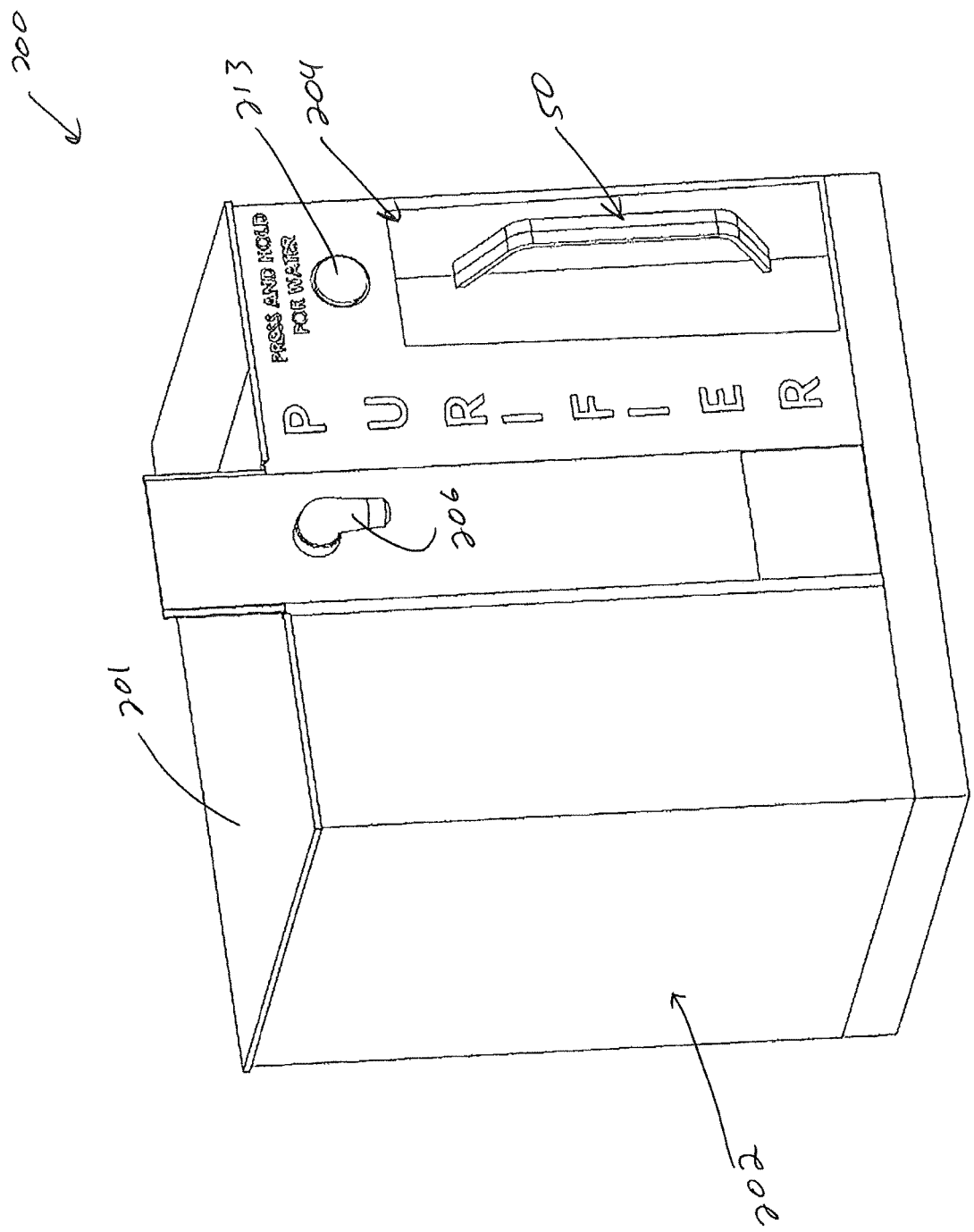
FIG. 6 is a front perspective view of a water filter assembly formed in accordance with an embodiment of the present disclosure.
Figure 7:
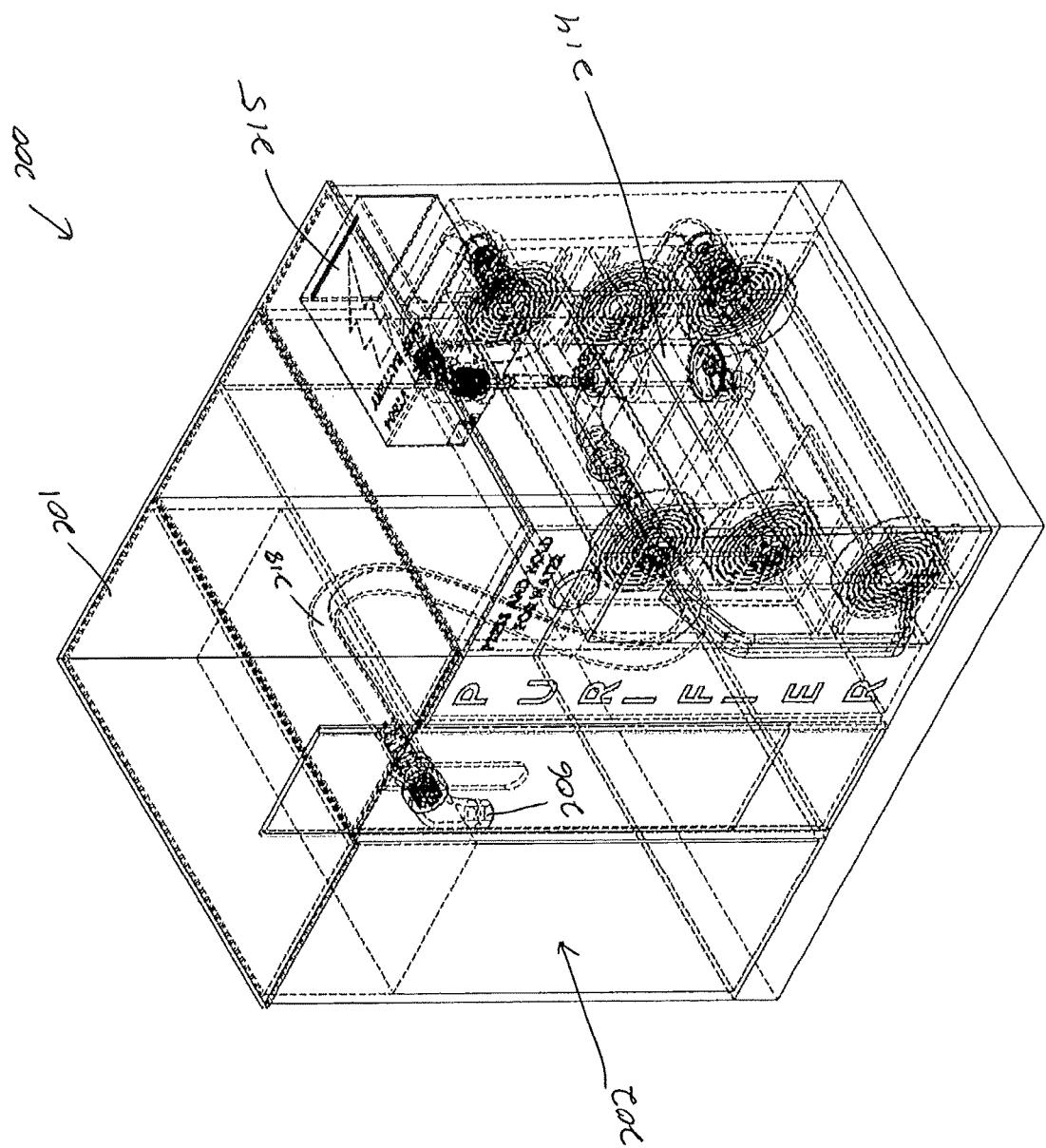
FIG. 7 is a front perspective internal view of a water filter assembly formed in accordance with an embodiment of the present disclosure.
Figure 8:
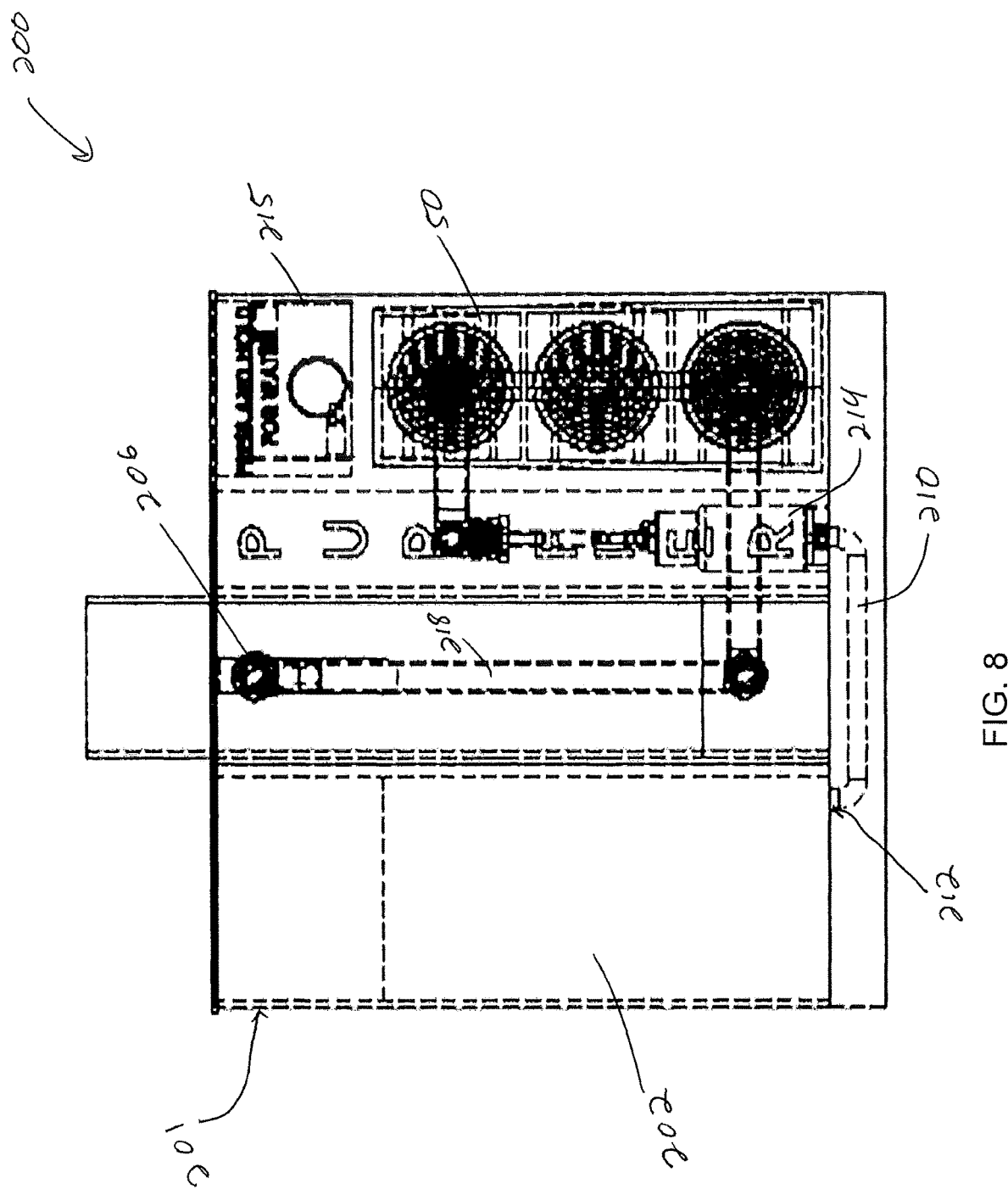
FIG. 8 is a front internal view of a water filter assembly formed in accordance with an embodiment.
Figure 9:
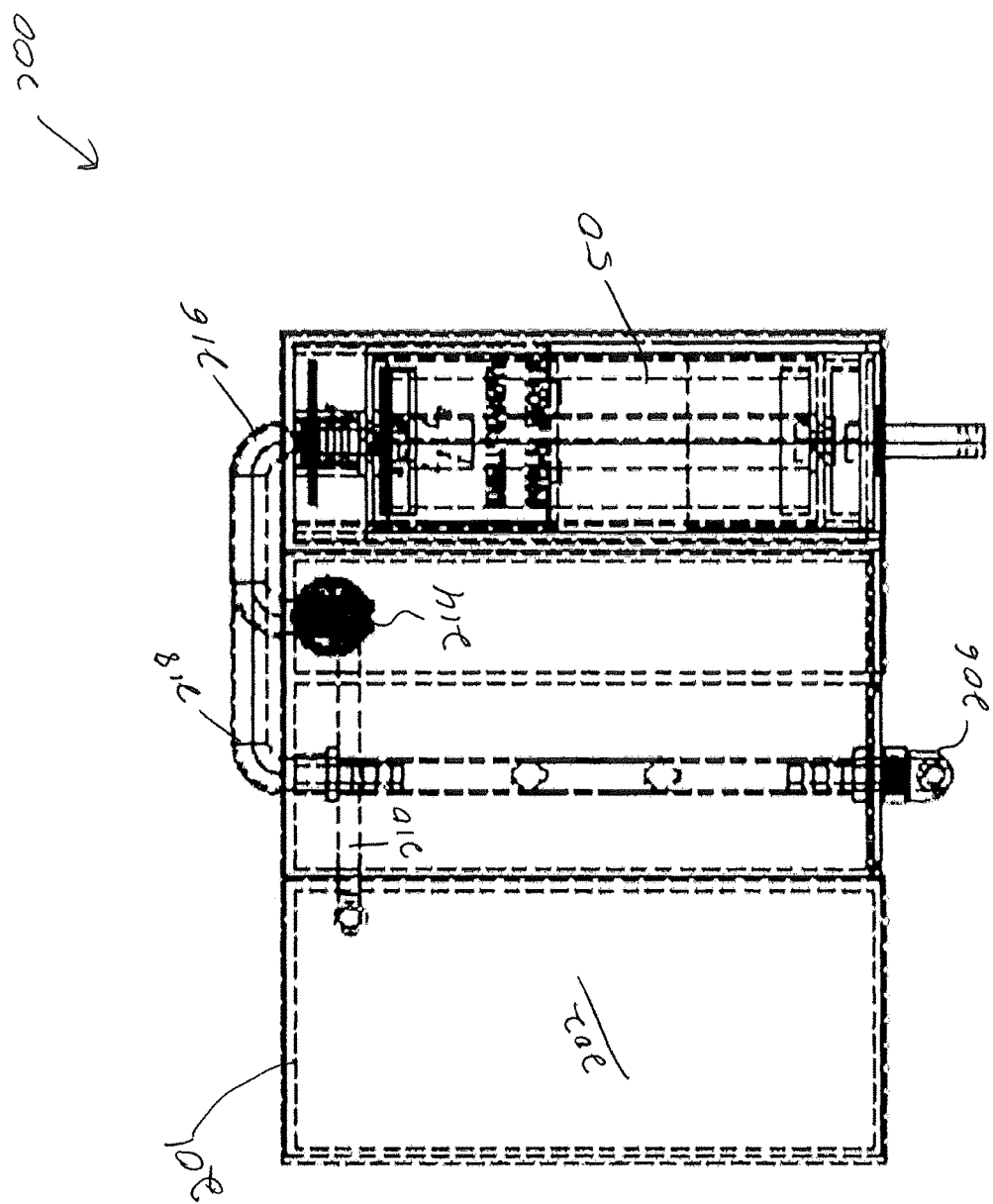
FIG. 9 is a top internal view of a water filter assembly formed in accordance with an embodiment of the present disclosure.
Figure 10:
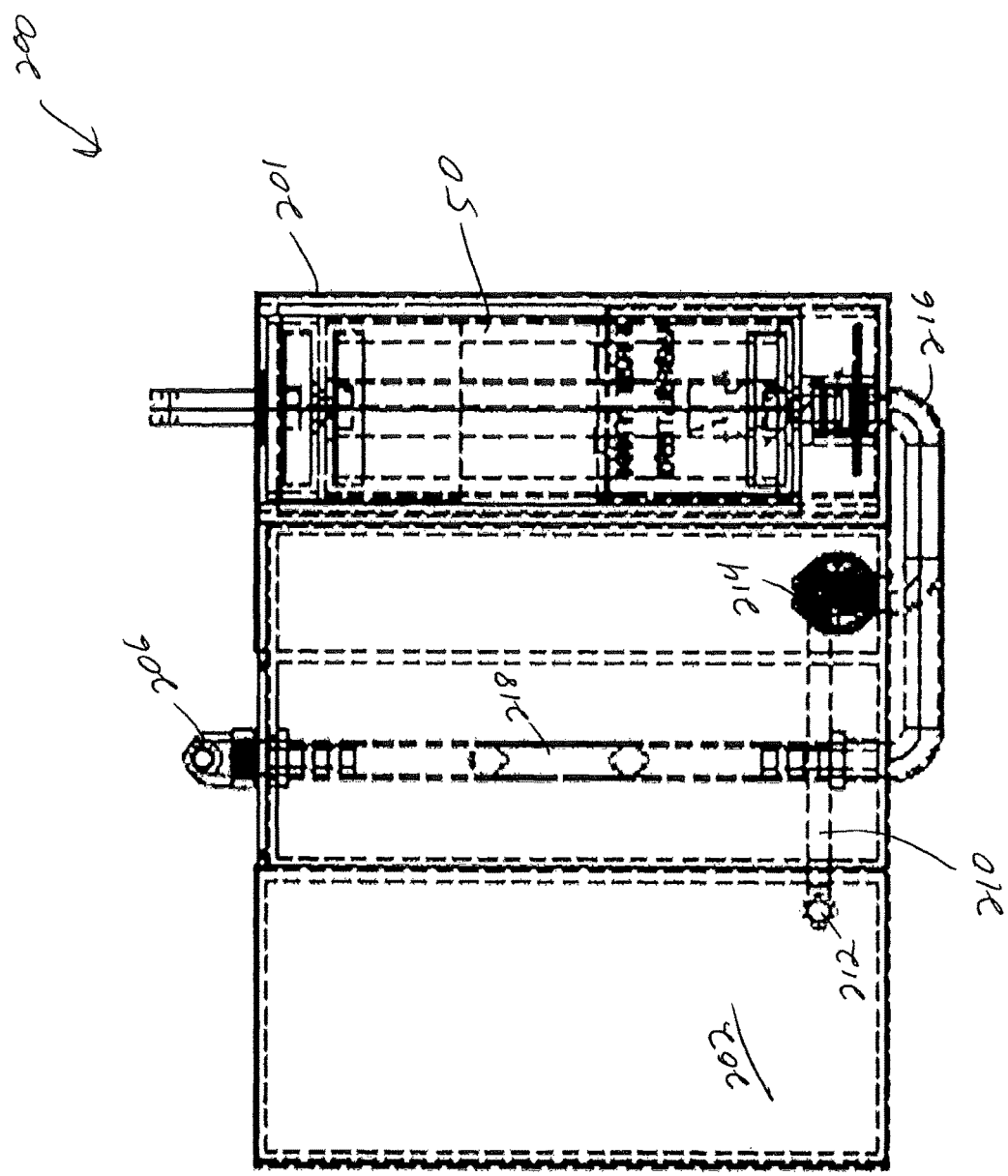
FIG. 10 is a bottom internal view of a water filter assembly formed in accordance with an embodiment of the present disclosure.
Figure 11:
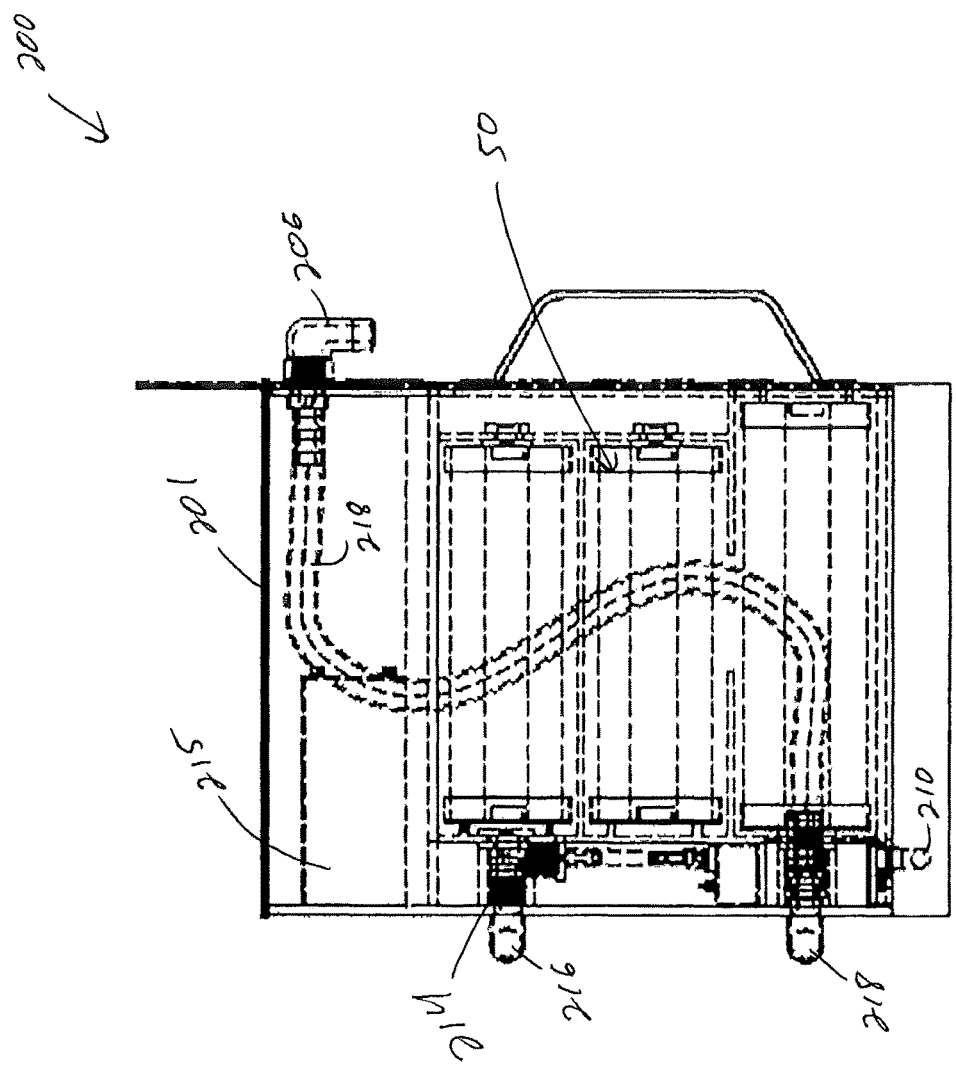
FIG. 11 is a first side internal view of a water filter assembly formed in accordance with an embodiment of the present disclosure.
Figure 12:
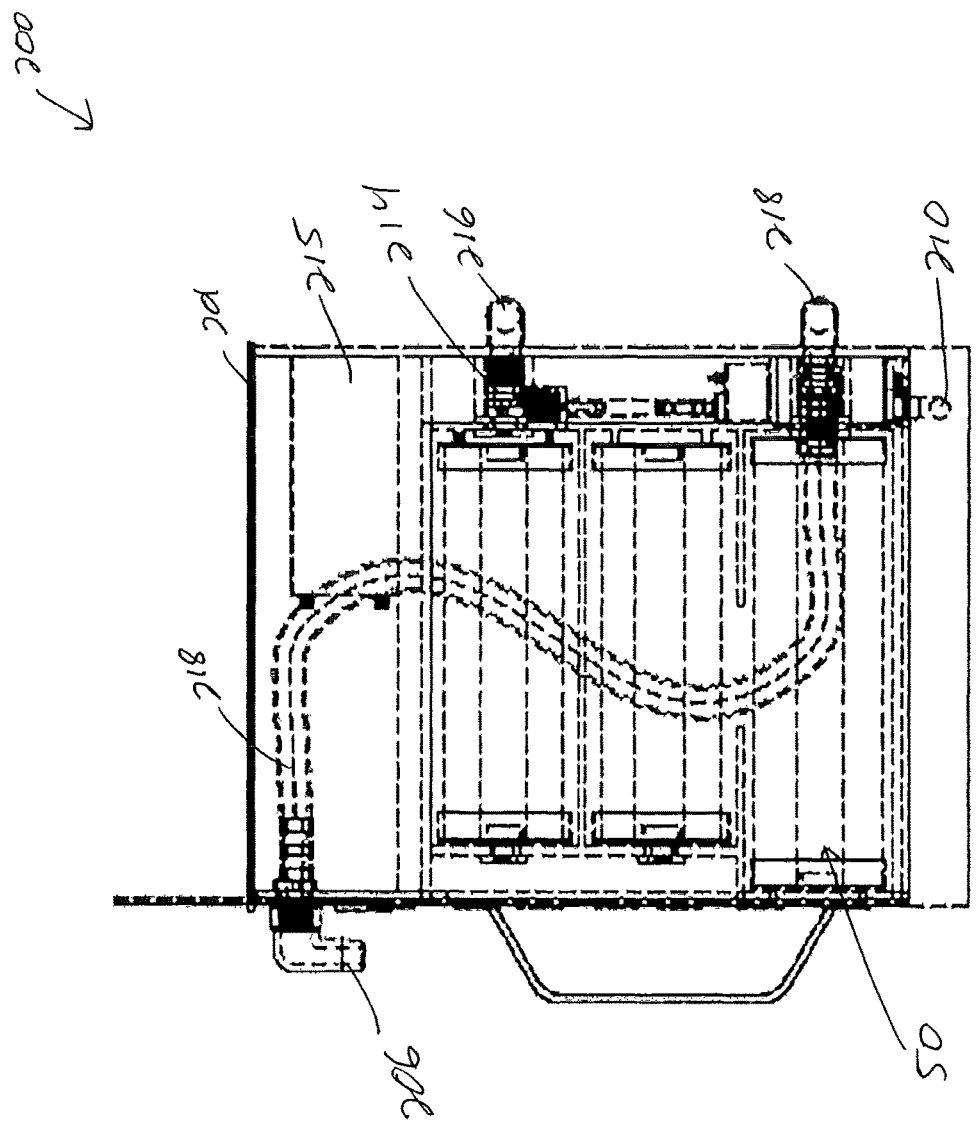
FIG. 12 is a second side internal view of a water filter assembly formed in accordance with an embodiment of the present disclosure.

During operation, as shown in FIG. 5, the water flow A from the source of water flows through the inlet fitting 152 of the first filter component 150 and into the chamber 160 defined by the first filter component 150. Within the chamber 160 the water undergoes a first stage of filtration. The water exits the first filter component 150 through the outlet 154 of the first filter component, which extends through the passageway 126 defined in the wall 120. The water is then directed into the intermediate chamber 128.

In one embodiment, gravity directs the water through the intermediate chamber 128. In one embodiment, the pressure of the water source directs the water through the intermediate chamber 128. The water in the intermediate chamber 128 is directed into the inlet 172 of the second filter component, which extends through the passageway 132 formed in the wall 120.

The water flowing into the inlet 172 then flows into the chamber 178 of the second filter component 170 where the water undergoes a second stage of filtration. The water in the chamber 178 permeates through the outer wall 176 of the second filter component 170 and flows into the second filter chamber 134. In one embodiment, gravity directs the water in the second filter chamber 134 through the opening 136 in the wall 130 such that the water flows into the third filter chamber 138. In one embodiment, the pressure from the source of water directs the water through the opening 136 and into the third filter chamber 138.

The water in the third filtered chamber 138 permeates the outer wall 185 of the third filter component 180 and flows into the chamber 186 of the third filter component where the water undergoes a third stage of filtration. The water then passes through the outlet fitting 182 of the third filter component 180, which extends through the outlet 140 formed in the second side 112. A device for controlling the flow of water may be coupled to the outlet fitting 182. For example, a hose, a spigot, a faucet, or other similar device may be coupled to the outlet fitting 182 to control the flow of filtered water from the water filter 50.

In one embodiment, the water filter 50 may be capable of filtering approximately 5,000 to approximately 7,000 gallons of water. In one embodiment, the water filter 50 may be replaced after approximately six months. In one embodiment, the water filter 50 may be injected with a compound that facilitates prohibiting bacteria growth on the filter components and within the housing. In one embodiment, the water filter 50 is fully disposable.

FIGS. 6-12 illustrate a water filter assembly 200 that may utilize the water filter 50. The water filter assembly 200 includes a housing 201 that retains a reservoir 202, a water filter compartment 204, an outlet 206, and a battery 215. The reservoir 202 is constructed and arranged to retain unfiltered water. In one embodiment, the water filter compartment 204 is constructed and arranged to receive the water filter 50. In the illustrated embodiment, the outlet 206 is a spigot. In other embodiments, the outlet 206 may be constructed and arranged to couple to a hose or other device for controlling the flow of water.

FIGS. 7-12 illustrate the internal tubing of the water filter assembly 200. It will be appreciated by one of skill in the art that, although the disclosed embodiments are described with respect to tubing, any method of directing water, for example, piping, may be utilized with the water filter assembly 200. The water filter assembly 200 includes an unfiltered water passage 210 formed in the illustrated embodiment with tubing. The unfiltered water passage 210 extends from an outlet 212 formed in the reservoir 202 to a pump 214. In one embodiment, the pump 214 may be powered by the battery 215 or, alternatively, an external power source. A pressurized water passage 216, formed in the illustrated embodiment with tubing, extends from the pump 214 to the water filter 50. Particularly, the pressurized water passage 216 extends from the pump 214 to the inlet fitting 152 of the first filter component 150. In one embodiment, at least a portion of the pressurized water passage 216 extends outside of the housing 201. A filtered water passage 218, formed in the illustrated embodiment with tubing, extends from the water filter 50 to the outlet 206. In particular, the filtered water passage 218 extends from the outlet fitting 182 of the third filter component 180 to the outlet 206 of the water filter assembly 200. In one embodiment, at least a portion of the filtered water passage 218 extends outside of the housing 201.

During operation, a button 213 activates the pump 214 of the water filter assembly 200. The pump 214 draws water from the reservoir 202 through the unfiltered water passage 210. The pump 214 then pressurizes the water and directs the water through the pressurized water passage 216 to the water filter 50. The water passes through the water filter 50 as described above to form filtered water. The filtered water flows from the water filter 50 to the outlet 206 of the water filter assembly 200.

The embodiments described herein provide a portable water filter capable of filtering water through three stages at any source of water. The embodiments described herein are of reduced size and weight in comparison to known water filters. For example, the embodiments described herein reduce the need for large water containers on vehicles, such as recreational vehicles (RVs). The embodiments described herein can be coupled to any source of water to provide fresh water at any location. Further, the three stage filtering process of the embodiments described herein enable the filtering of most water sources into useable, drinkable water. For example, the three stage filtering process of the disclosed embodiments may filter sediment, chemicals, metals, bacteria, viruses, and fungi from the water, to name a few non-limiting examples.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A water filter assembly comprising:
an unfiltered water reservoir;
a pump in fluid communication with the unfiltered water reservoir;
a water filter in fluid communication with the pump, the water filter including a housing having a plurality of external walls, the housing comprising a first section coupled to a corresponding second section to enclose an interior of the housing, the housing being water-tight except for a housing inlet and a housing outlet, the interior of the housing comprising a plurality of internal walls, the plurality of internal walls defining, with the plurality of external walls of the housing, at least a first chamber, a second chamber, and a third chamber inside the housing, the first chamber being water-tight except for the housing inlet through one of the plurality of external walls by which water may be introduced into the first chamber and a first chamber outlet through one of the plurality of internal walls by which the water may be released from the first chamber, the second chamber being water-tight except for a second chamber inlet through one of the plurality of internal walls by which a water may be introduced into the second chamber and a second chamber outlet through one of the plurality of internal walls by which the water may be released from the second chamber, and the third chamber being water-light except for a third chamber inlet through one of the plurality of internal walls by which a water may be introduced into the third chamber and the housing outlet through one of the plurality of external walls by which the water may be released from the third chamber;
a first filter positioned in the first chamber and arranged such that the water, when introduced through the housing inlet, must pass through the first filter in order to be released from the first chamber through the first chamber outlet;
a second filter, positioned in the second chamber and arranged such that the water, when, introduced through the second chamber inlet, must pass through the second filter in order to be released from the second chamber through the second chamber outlet; and a third filter, positioned in the third chamber and arranged such that the water, when introduced through, the third chamber inlet, must pass through the third filter in order to be released from the third chamber through the housing outlet.

2. The water filter assembly of claim 1 further comprising:
an unfiltered water passage coupling the unfiltered water reservoir to the pump;
a pressurized water passage coupling the pump to the first filter inlet in fluid communication; and
a filtered water passage coupling the water filter assembly outlet to the third filter outlet in fluid communication.

3. The water filter assembly of claim 1, wherein water flows through the first filter, the second filter, and the third filter in series.

4. A filter comprising:
a housing having a plurality of external walls, the housing comprising a first section coupled to a corresponding second section to enclose an interior of the housing, the housing being liquid-tight except for a housing inlet and a housing outlet, the interior of the housing comprising a plurality of internal walls, the plurality of internal walls defining, with the plurality of external walls of the housing, at least a first chamber, a second chamber, and a third chamber inside the housing, the first chamber being liquid-tight except for the housing inlet through one of the plurality of external walls by which a liquid may be introduced into the first chamber and a first chamber outlet through one of the plurality of internal walls by which the liquid may be released from the first chamber, the second chamber being liquid-tight except for a second chamber inlet through one of the plurality of internal walls by which a liquid may be introduced into the second chamber and a second chamber outlet through one of the plurality of internal walls by which the liquid may be released from the second chamber, and the third chamber being liquid-light except for a third chamber inlet through one of the plurality of internal walls by which a liquid may be introduced into the third chamber and the housing outlet through one of the plurality of external walls by which the liquid may be released from the third chamber;

a first filter positioned in the first chamber and arranged such that the liquid, when introduced through the housing inlet, passes through the first filter in order to be released from the first chamber through the first chamber outlet;

a second filter, positioned in the second chamber and arranged such that the liquid, when, introduced through the second chamber inlet, passes through the second filter in order to be released from the second chamber through the second chamber outlet; and a third filter, positioned in the third chamber and arranged such that the liquid, when introduced through, the third chamber inlet, passes through the third filter in order to be released from the third chamber through the housing outlet.

5. The filter of claim 4, wherein the liquid flows through the first filter, the second filter, and the third filter in series.

6. The filter of claim 4, wherein the liquid enters the housing through the housing inlet, flows through the first filter, the second filter, and the third filter in series, and is released from the housing through the housing outlet.

7. The filter of claim 4, wherein the second chamber outlet and the third chamber inlet are formed by an opening through one of the internal walls.

8. The filter of claim 4, further comprising
an intermediate chamber for providing fluid communication between the first chamber outlet and the second chamber inlet.

9. The filter of claim 4, wherein the first filler comprises a melt blown filter.

10. The filter of claim 4, wherein the second filter comprises a carbon filter.

11. The filter of claim 4, wherein the third filter comprises a thermoplastic polymer filter.

* * * * *